(12) United States Patent
Chitta et al.

(10) Patent No.: US 9,864,734 B2
(45) Date of Patent: *Jan. 9, 2018

(54) CLICKABLE LINKS WITHIN LIVE COLLABORATIVE WEB MEETINGS

(71) Applicant: International Business Machines Corporation, Armonk, NY (US)

(72) Inventors: Anuradha D. Chitta, Bangalore (IN); Soumitra G. Limaye, Pune (IN); Ranjit S. Rai, Pune (IN)

(73) Assignee: International Business Machines Corporation, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/824,284

(22) Filed: Aug. 12, 2015

(65) Prior Publication Data

US 2017/0046314 A1 Feb. 16, 2017

(51) Int. Cl.
| | | |
|---|---|---|
| *G06F 17/00* | (2006.01) | |
| *G06F 17/22* | (2006.01) | |
| *H04L 29/06* | (2006.01) | |
| *H04L 29/08* | (2006.01) | |
| *H04N 21/8543* | (2011.01) | |
| *G06F 17/30* | (2006.01) | |

(Continued)

(52) U.S. Cl.
CPC ...... *G06F 17/2235* (2013.01); *G06F 3/04842* (2013.01); *G06F 3/1454* (2013.01); *G06F 17/2765* (2013.01); *G06F 17/30873* (2013.01); *G06T 11/60* (2013.01); *H04L 65/1083* (2013.01); *H04L 65/403* (2013.01); *H04L 67/02* (2013.01); *H04N 21/4725* (2013.01); *H04N 21/8543* (2013.01); *H04N 21/8586* (2013.01); *G06F 2216/15* (2013.01)

(58) Field of Classification Search
CPC .......... G06F 17/30873; G06F 2216/15; H04N 21/8543
See application file for complete search history.

(56) References Cited

U.S. PATENT DOCUMENTS

| | | | |
|---|---|---|---|
| 5,774,666 | A | 6/1998 | Portuesi |
| 5,778,181 | A | 7/1998 | Hidary |

(Continued)

FOREIGN PATENT DOCUMENTS

| | | |
|---|---|---|
| EP | 0589119 A1 | 9/1992 |
| EP | 0978087 B1 | 4/1998 |

OTHER PUBLICATIONS

U.S. Appl. No. 15/157,044, filed May 17, 2016.

(Continued)

*Primary Examiner* — Laurie Ries
(74) *Attorney, Agent, or Firm* — Maeve Carpenter; Alexander G. Jochym

(57) ABSTRACT

An approach for creating a clickable link within a presentation during a live collaborative web meeting is provided. The approach identifies one or more uniform resource locators within the presentation. The approach retrieves metadata for each of the one or more uniform resource locators within the presentation. The approach presents the metadata for each of the one or more uniform resource locators with a corresponding image from the presentation. The approach creates the clickable link for each of the one or more uniform resource locators with the corresponding image.

17 Claims, 3 Drawing Sheets

(51) Int. Cl.
  *H04N 21/4725* (2011.01)
  *H04N 21/858* (2011.01)
  *G06F 3/14* (2006.01)
  *G06T 11/60* (2006.01)
  *G06F 3/0484* (2013.01)
  *G06F 17/27* (2006.01)

(56) References Cited

U.S. PATENT DOCUMENTS

| | | | |
|---|---|---|---|
| 5,878,222 A | 3/1999 | Harrison | |
| 5,896,533 A | 4/1999 | Ramos | |
| 5,898,429 A * | 4/1999 | Trom | G06T 11/60 715/203 |
| 5,905,248 A | 5/1999 | Russell | |
| 5,917,491 A * | 6/1999 | Bauersfeld | G06F 3/0483 707/E17.013 |
| 5,991,773 A * | 11/1999 | Tagawa | G06F 17/30873 |
| 6,018,764 A | 1/2000 | Field | |
| 6,037,934 A * | 3/2000 | Himmel | G06F 17/30884 707/E17.114 |
| 6,041,324 A * | 3/2000 | Earl | G06F 17/30887 |
| 6,073,135 A * | 6/2000 | Broder | G06F 17/30873 |
| 6,085,242 A | 7/2000 | Chandra | |
| 6,141,684 A * | 10/2000 | McDonald | G07F 17/0014 705/52 |
| 6,144,991 A * | 11/2000 | England | G06F 17/30873 707/E17.111 |
| 6,167,453 A * | 12/2000 | Becker | G06F 17/30887 707/E17.115 |
| 6,208,659 B1 | 3/2001 | Govindarajan | |
| 6,266,442 B1 * | 7/2001 | Laumeyer | G06K 9/00818 382/104 |
| 7,149,776 B1 * | 12/2006 | Roy | G06F 17/30873 707/E17.111 |
| 7,155,451 B1 * | 12/2006 | Torres | G06F 17/30867 |
| 7,386,875 B2 | 6/2008 | Kikinis | |
| 7,533,146 B1 * | 5/2009 | Kumar | G06F 17/30873 707/E17.111 |
| 8,031,940 B2 * | 10/2011 | Vincent | G06K 9/3258 382/176 |
| 8,358,843 B2 * | 1/2013 | Park | G06K 9/344 382/176 |
| 8,373,724 B2 * | 2/2013 | Ratnakar | G06K 9/033 345/619 |
| 8,515,816 B2 * | 8/2013 | King | H04N 1/00244 705/26.5 |
| 8,521,667 B2 * | 8/2013 | Zhu | G06F 21/56 706/13 |
| 8,606,819 B2 * | 12/2013 | Torres | G06F 17/30873 707/795 |
| 8,719,031 B2 | 5/2014 | Gibbon et al. | |
| 9,092,533 B1 * | 7/2015 | Demathieu | G06F 17/30873 |
| 9,628,534 B2 * | 4/2017 | Rhyu | H04L 65/4069 |
| 2003/0018966 A1 | 1/2003 | Cook | H04N 7/165 725/2 |
| 2004/0080528 A1 * | 4/2004 | Rand | G06F 17/30017 715/738 |
| 2004/0119741 A1 * | 6/2004 | Teng | G06F 17/30905 715/760 |
| 2005/0154679 A1 * | 7/2005 | Bielak | G09B 7/02 705/59 |
| 2007/0002077 A1 * | 1/2007 | Gopalakrishnan | H04N 1/00307 345/619 |
| 2007/0016563 A1 * | 1/2007 | Omoigui | G06F 17/3061 |
| 2007/0047818 A1 * | 3/2007 | Hull | G06K 9/00442 382/190 |
| 2007/0118394 A1 * | 5/2007 | Cahoon | G06Q 30/02 705/1.1 |
| 2008/0027824 A1 | 1/2008 | Callaghan | |
| 2009/0271479 A1 * | 10/2009 | Reisinger | G06Q 10/00 709/204 |
| 2010/0031162 A1 * | 2/2010 | Wiser | G06Q 30/0255 715/747 |
| 2010/0054585 A1 * | 3/2010 | Guillou | G06K 9/3266 382/164 |
| 2010/0070448 A1 | 3/2010 | Omoigui | |
| 2010/0082746 A1 * | 4/2010 | Ulrich | G06F 17/30873 709/204 |
| 2010/0153364 A1 | 6/2010 | Kirby | |
| 2010/0158099 A1 * | 6/2010 | Kalva | H04N 21/23412 375/240.01 |
| 2010/0235446 A1 * | 9/2010 | Hehmeyer | G06Q 10/109 709/205 |
| 2010/0268694 A1 * | 10/2010 | Denoue | G06F 17/30873 707/693 |
| 2011/0063415 A1 * | 3/2011 | Gefen | H04N 5/4403 348/43 |
| 2011/0083144 A1 * | 4/2011 | Bocharov | H04N 7/17318 725/32 |
| 2011/0202854 A1 * | 8/2011 | Chan | G06F 3/1454 715/762 |
| 2011/0320526 A1 * | 12/2011 | Bhogal | G06F 17/30902 709/203 |
| 2012/0290950 A1 * | 11/2012 | Rapaport | H04L 51/32 715/753 |
| 2013/0007103 A1 * | 1/2013 | Braun | H04N 21/25 709/203 |
| 2013/0297645 A1 * | 11/2013 | Foresti | G06F 17/2247 707/769 |
| 2014/0129942 A1 * | 5/2014 | Rathod | H04N 21/44222 715/720 |
| 2014/0201126 A1 * | 7/2014 | Zadeh | G06K 9/627 706/52 |
| 2014/0249911 A1 * | 9/2014 | Znerold | G06Q 30/0242 705/14.41 |
| 2015/0007040 A1 * | 1/2015 | Xu | G06F 17/3089 715/738 |
| 2015/0237082 A1 * | 8/2015 | Duong | G06F 17/30887 715/753 |
| 2016/0112476 A1 | 4/2016 | Gudipaty et al. | |
| 2017/0041372 A1 * | 2/2017 | Hosur | H04N 21/25883 |

OTHER PUBLICATIONS

Appendix P (List of IBM Patents or Patent Applications Treated as Related), 2 pages, filed May 17, 2016.
Cimatti, "How to activate URL Links in Slideshare", SlideCoaching.com, Apr. 12, 2010, Copyright © 2008-2015 Cimatti Alessandra, pp. 1-6, <http://www.slidecoaching.com/2010/04/how-to-activate-url-links-slideshare/>.
Nakagawa et al., "Mathematical Knowledge Browser with Automatic Hyperlink Detection", M. Kohlhase (Ed.): MKM 2005, LNAI 3863, pp. 190-202, 2006, © Springer-Verlag Berlin Heidelberg, <https://groups.google.com/forum/#!topic/tesseract-ocr/CvXqgunqiMQ>.
"Advanced A/P Document Imaging", © 2015, Verbella CMG, LLC, Printed on Aug. 7, 2015, p. 1-2, <http://www.verbellacmg.com/Verbella%20DataSheets/SAP%20Content%20Server%20for%20AP%20Advance%20rev%2008_03_09.pdf>.
"Using OCR to recognize http urls", Google Groups, Posted: Nov. 20, 2009, Printed: May 19, 2015, 1 page, <https://groups.google.com/forum/#!topic/tesseract-ocr/CvXqgunqiMQ>.
U.S. Appl. No. 15/067,327, filed Mar. 11, 2016.
Appendix P (List of IBM Patents or Patent Applications Treated as Related), 2 pages, filed Mar. 11, 2016.
U.S. Appl. No. 15/333,635, filed Oct. 25, 2016.
Appendix P (List of IBM Patents or Patent Applications Treated as Related), 2 pages, Filed herewith.
Chiu et al., LiveMinutes: An Internet-Based System for Multimedia Meeting Minutes, Copyright held by the author/owner, WWW10, May 2-5, 2001, Hong kong, ACM 1-58113-348-0/01/0005, pp. 1-18.
Gardner et al.; "Automatic Link Detection: A Sequence Labeling Approach"; Proceedings of the 18th ACM conference on Informa-

(56) References Cited

OTHER PUBLICATIONS tion and Knowledge Management, pp. 1701-1704, Nov. 2-6, 2009; Hong Kong, China; Copyright 2009, ACM.

* cited by examiner

CLICKABLE LINKS WITHIN LIVE COLLABORATIVE WEB MEETINGS

BACKGROUND OF THE INVENTION

The present invention relates generally to collaborative technologies, and more particularly to creating clickable web links within live collaborative web meetings.

Collaborative web meetings and presentations can be an integral part of education and corporate culture. During a presentation, there may be numerous times when there is a web link, such as a uniform resource locator (URL), within a slide of the presentation, where the web link may be a reference or additional information related to the subject matter presented. Typically, collaborative web meetings and presentations can be rendered as an image to participants viewing the presentation remotely.

SUMMARY

Aspects of an embodiment of the present invention disclose a method, a computer system, and a computer program product for creating a clickable link within a live collaborative web meeting, in accordance with an embodiment of the present invention. The method includes identifying, by one or more computer processors, one or more uniform resource locators within the presentation. The method includes retrieving, by one or more computer processors, metadata for each of the one or more uniform resource locators within the presentation. The method includes presenting, by one or more computer processors, the metadata for each of the one or more uniform resource locators with a corresponding image from the presentation. The method includes creating, by one or more computer processors, the clickable link for each of the one or more uniform resource locators with the corresponding image.

DETAILED DESCRIPTION

Embodiments of the present invention recognize that a presentation during a collaborative web meeting is rendered as an image to a remote participant, and as such, the remote participant cannot click on a web link presented in a slide of a presentation. Embodiments of the present invention further recognize that viewing details and information in a web link at the time of a presentation (i.e., during a live web meeting session) can facilitate a remote participant's understanding of the subject matter presented.

Embodiments of the present invention provide the capability to present web links in a collaborative web meeting as clickable links within the context of the presentation to remote participants, such that whenever there is a web link within a slide presented during the collaborative web meeting, remote participants can click a portion of the slide with the web link to open a corresponding URL and browse the details on the URL seamlessly while the collaborative web meeting is in session. Embodiments of the present invention further provide the capability to promote ease of context based browsing in areas specific to the content in the presentation slides while the web meeting is in session. Embodiments of the present invention further provide the capability to create clickable links for URLs in the context of a slide presented in a web meeting, such that a remote participant can explore a presented topic in depth during the live presentation. Embodiments of the present invention further provide the capability to increase the learning capability of participants during remote web meeting sessions and ensure a better understanding of the subject matter presented in the web meeting through clickable links to resources and additional information.

Implementation of such embodiments may take a variety of forms, and exemplary implementation details are discussed subsequently with reference to the Figures.

Figure 1:
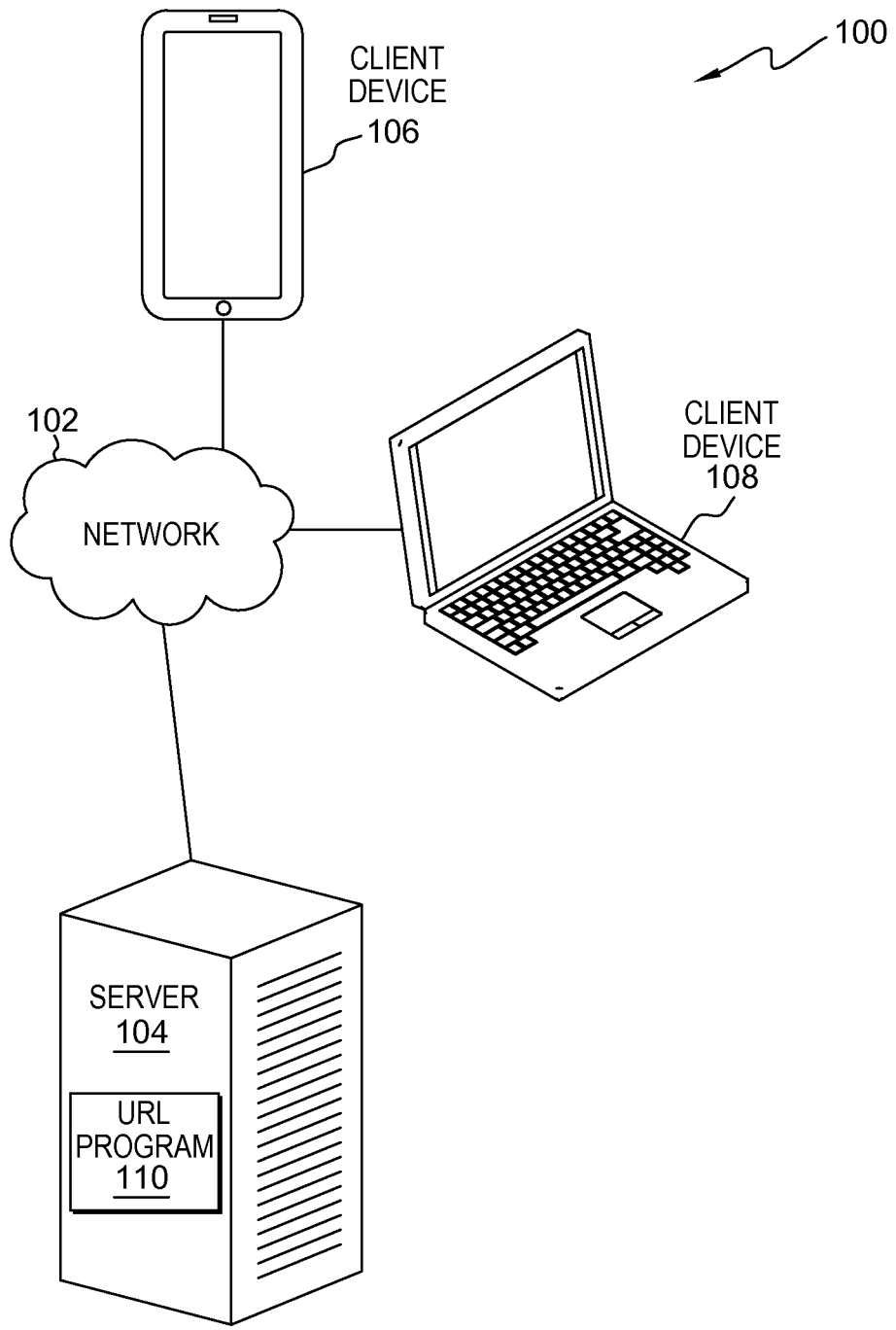
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client devices, such as client device 106 and client device 108.

In one embodiment, network 102 is the Internet representing a worldwide collection of networks and gateways that use TCP/IP protocols to communicate with one another. Network 102 may include wire cables, wireless communication links, fiber optic cables, routers, switches, and/or firewalls. Server 104, client device 106, and client device 108 are interconnected by network 102. Network 102 can be any combination of connections and protocols capable of supporting communications between server 104, client device 106, client device 108, and URL program 110. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, server 104 may be, for example, a server computer system, such as a management server, a web server, or any other electronic device or computing system capable of sending and receiving data. In another embodiment, server 104 may be a data center consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes URL program 110 for creating clickable web links within collaborative web meetings.

In one embodiment, URL program 110 operates on a central server, such as server 104, and can be utilized by one or more client devices, such as client device 106 and client device 108, via network 102. In another embodiment, URL program 110 may be a software-based program downloaded from the central server, such as server 104, or a third-party provider (not shown), and executed on a client device, such as client device 106 and client device 108, to create clickable web links within a collaborative web meeting. In another embodiment, URL program 110 may be a software-based program, downloaded from a central server, such as server 104, and installed on one or more client devices, such as client device 106 and client device 108. In yet another embodiment, URL program 110 may be utilized as a software service provided by a third-party cloud service provider (not shown). In yet another embodiment, URL program 110 may include one or more software-based components, such as add-ons, plug-ins, and agent programs, etc., installed on one or more client devices, such as client device 106 and client device 108, for creating clickable web links within collaborative web meetings.

In one embodiment, URL program 110 is a software-based program for creating clickable web links within collaborative web meetings. In one embodiment, URL program 110 provides the capability for a user (i.e., a remote participant of a collaborative web meeting) to click on web links presented within the content of a slide of a presentation during a live session of a collaborative web meeting. In some embodiments, URL program 110 may provide the capability for a user to click on web links presented within content of web conferences, educational presentations, training modules, etc., or any other type of live meeting where content from an original presentation on a host computer is presented as a rendered image to one or more users in a live web-based collaborative learning environment. In one embodiment, URL program 110 provides the capability to identify one or more web links (e.g., URLs) within a presentation during a live collaborative web meeting session. In one embodiment, URL program 110 includes one or more server-side components for scanning each slide of a presentation to identify one or more web links (i.e., URLs) within each slide. In one embodiment, URL program 110 includes one or more client-side components for creating a clickable link for one or more identified web links within each slide in a presentation. In one embodiment, URL program 110 provides the capability to create a clickable link at a position within a slide of a presentation where a web link is presented, such that during a live collaborative web meeting session a remote participant can utilize the web link to browse related additional information and resources provided by the web link.

In the exemplary embodiment, client device 106 and client device 108 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 and client device 108 may be a laptop computer capable of connecting to a network, such as network 102, to host or participate in a collaborative web meeting and communicate with a central server to utilize a software-based program, such as URL program 110 of server 104. In one embodiment, client device 106 and client device 108 may be any suitable type of mobile device capable of running mobile applications, including a smart phone, tablet, slate, or any type of device that runs a mobile operating system and is capable of connecting to a network, such as network 102, to host or participate in a collaborative web meeting. In one embodiment, client device 106 and client device 108 include a user interface (not shown) for utilizing a clickable link within a collaborative web meeting where the user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curves of command-line interfaces, which required commands to be typed on the keyboard. The actions in GUIs are often performed through direct manipulation of the graphics elements.

Figure 2:
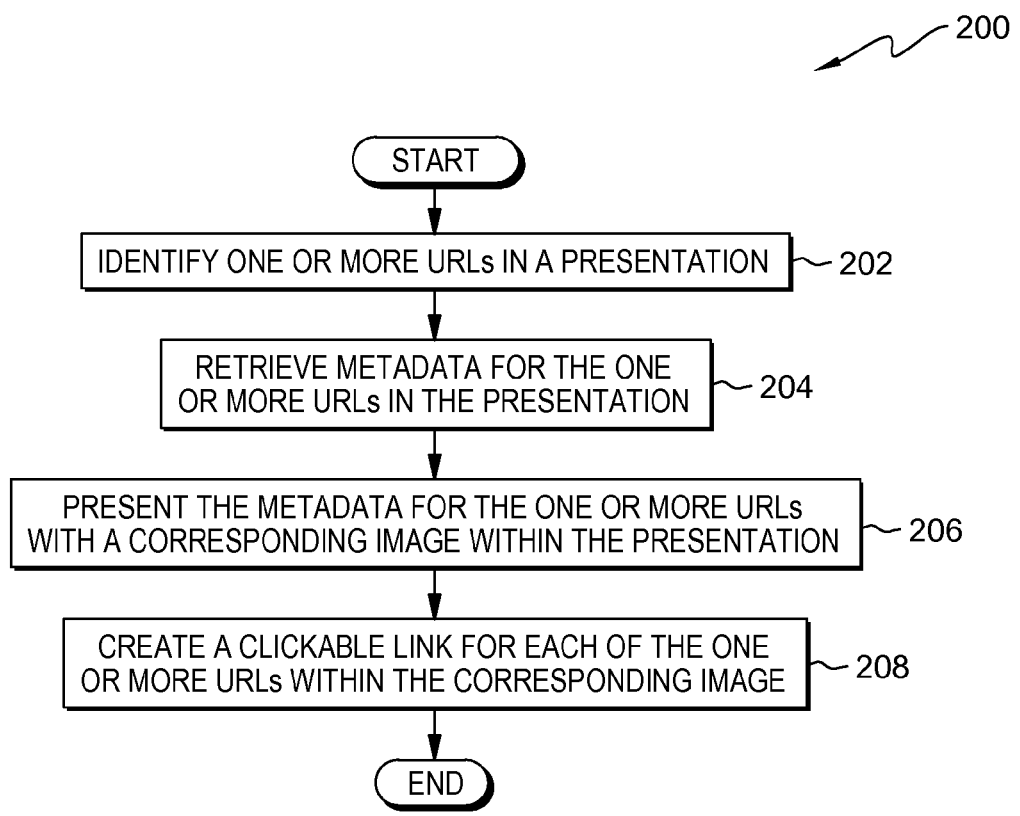
FIG. 2 is a flowchart depicting operational steps of a URL program, such as the URL program of FIG. 1, for creating clickable links within live collaborative web meetings, in accordance with an embodiment of the present invention.

FIG. 2 depicts a flowchart of operational steps of a URL program, such as URL program 110 of FIG. 1, generally designated 200, for creating clickable links within live collaborative web meetings, in accordance with an embodiment of the present invention.

URL program 110 identifies one or more URLs in a presentation (202). In one embodiment, URL program 110 identifies one or more URLs in a presentation by scanning a plurality of slides within the presentation for one or more URLs. In some embodiments, a presentation may be a process of presenting a topic to an audience, such as during a lecture, a demonstration, a training seminar, or a speech. In other embodiments, a presentation may include Internet-based presentation programs, as well as presentation software used to generate presentation content as a visualization for an audience. In one embodiment, URL program 110 utilizes a server-side component, such as a conventional text scanner, to scan each slide in a plurality of slides within a presentation to identify URL text patterns or active hyperlinks. In one embodiment, URL program 110 performs a scan for one or more URLs whenever a presentation is uploaded from a host computer to a collaborative web meeting as a rendered image to share the presentation content globally with one or more remote participants.

In another embodiment, URL program 110 may utilize a participant client-side plug-in to leverage optical character recognition (OCR) techniques to identify text within a slide of a presentation (i.e., an image) and further identify which of the identified text within the slide are URLs. In this embodiment, URL program 110 may utilize OCR techniques to monitor a plurality of images within the presentation for URL patterns and identify any URL text patterns within a slide of the presentation (i.e., image screens being shared during a live collaborative web meeting session).

URL program 110 retrieves metadata for the one or more URLs in the presentation (204). In one embodiment, URL program 110 retrieves metadata for the one or more URLs in the presentation by extracting information (i.e., metadata) related to each of the one or more identified URLs, where information related to each of the one or more identified URLs includes, without limitation, actual URL text, a page number from the presentation (e.g., a slide number) where an identified URL exists, and a position of an identified URL within a slide of the presentation. For example, URL program 110 may extract actual URL text, such as "http://www.abcdef.com," a page number of a slide that the URL belongs to, such as "slide 18," and a position within the slide where the URL is located, such as "second bullet point, after the fourth word." In one embodiment, URL program 110 stores the metadata for each of the one or more URLs in a database (not shown) for future retrieval.

URL program 110 presents the metadata for each of the one or more URLs with a corresponding image within the presentation (206). In one embodiment, URL program 110 presents the metadata for each of the one or more URLs with a corresponding image (i.e., slide) within the presentation whenever a slide containing a URL is presented to a client device, such as client device 106 and client device 108, during a live collaborative web meeting. In one embodiment, when a slide containing a URL is presented during a live collaborative web meeting, URL program 110 utilizes a server-side component to retrieve the metadata for each of the one or more URLs identified within the slide stored in a database and further overlays the metadata at a position within the corresponding image where each of the one or more URLs were originally located in the presentation.

URL program 110 creates a clickable link for each of the one or more URLs within the corresponding image (208). In one embodiment, URL program 110 creates a clickable link for each of the one or more URLs within the corresponding image by identifying a position within the image where an overlay of the metadata for each of the one or more URLs is located and further enables the overlay of the metadata for each of the one or more URLs to function as a clickable link at a position within the image that mirrors an original position of each URL in the presentation. In some embodiments, URL program 110 may enable the overlay of the metadata for each of the one or more URLs to function as a clickable link by generating a hyperlink or web link using the metadata as an additional layer on top of the image or by any other suitable methods known in the art for overlaying data on an image and creating hyperlinks. In some embodiments, the clickable link may be highlighted, underlined, rendered in a contrasting text color (i.e., blue text), or any other means to distinguish the clickable link from surrounding content within the image. In one embodiment, URL program 110 utilizes a client-side component on a client device, such as client device 106 and client device 108, to present the metadata for a URL as a clickable link within an image screen being shared during a live collaborative web meeting session.

Figure 3:
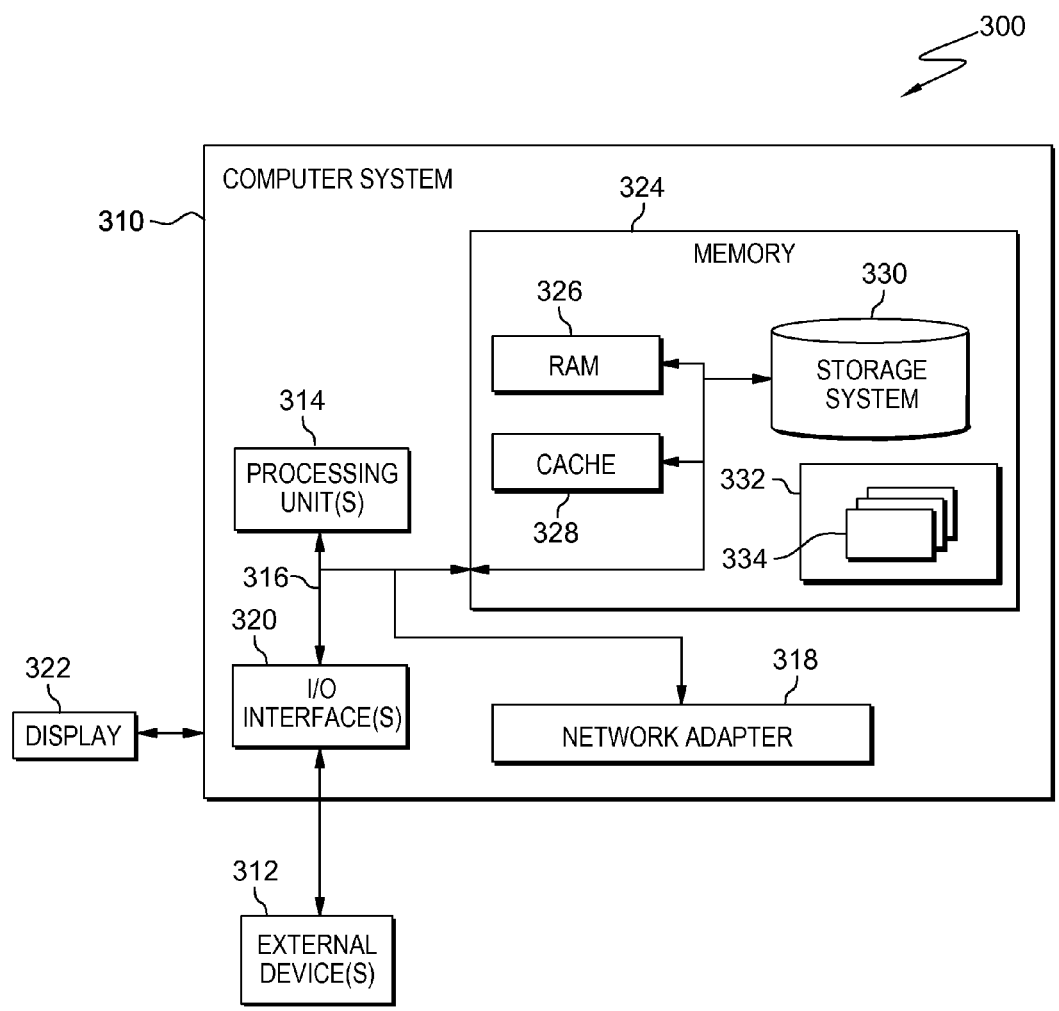
FIG. 3 is a block diagram depicting components of a data processing system (such as the server of FIG. 1), in accordance with an embodiment of the present invention.

FIG. 3 depicts a block diagram of components of data processing system, such as server 104 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for creating a clickable link within a presentation during a live collaborative web meeting, the method comprising:

identifying, by one or more computer processors, one or more uniform resource locators within the presentation;

retrieving, by one or more computer processors, metadata for each of the one or more uniform resource locators within the presentation;

presenting, by one or more computer processors, the metadata for each of the one or more uniform resource locators with a corresponding image from the presentation, wherein presenting includes utilizing a server-side component to retrieve metadata stored in a database for each of one or more identified uniform resource locators within a slide of the presentation and overlaying the metadata at a position within the corresponding image where each of the one or more identified uniform resource locators were originally located; and creating, by one or more computer processors, the clickable link for each of the one or more uniform resource locators with the corresponding image.

2. The method of claim 1, wherein identifying one or more uniform resource locators within the presentation, further comprises:

scanning, by one or more computer processors, a plurality of slides within the presentation for one or more uniform resource locators; and wherein scanning includes utilizing a conventional text scanner to identify uniform resource locator text patterns and active hyperlinks.

3. The method of claim 1, wherein retrieving metadata for each of the one or more uniform resource locators within the presentation, further comprises:

extracting, by one or more computer processors, information related to each of one or more identified uniform resource locators.

4. The method of claim 3, wherein information related to each of the one or more identified uniform resource locators includes at least one of:

a uniform resource locator text;

a page number from the presentation where an identified uniform resource locator exists; and a position of an identified uniform resource locator within a slide of the presentation.

5. The method of claim 1, wherein creating the clickable link for each of the one or more uniform resource locators with the corresponding image, further comprises:

identifying, by one or more computer processors, a position within the image where an overlay of metadata for each of the one or more uniform resource locators is located; and enabling, by one or more computer processors, the overlay of the metadata for each of the one or more uniform resource locators to function as a clickable link at a position within the image that mirrors an original position of each of the one or more uniform resource locators identified in the presentation.

6. The method of claim 5, further comprises:

utilizing, by one or more computer processors, a client-side component to present the metadata for each of the one or more uniform resource locators as a clickable link within an image screen shared during the live collaborative web meeting.

7. A computer program product for a creating clickable link within a presentation during a live collaborative web meeting, the computer program product comprising:

one or more computer readable storage media and program instructions stored on the one or more computer readable storage media, the program instructions comprising:

program instructions to identify one or more uniform resource locators within the presentation;

program instructions to retrieve metadata for each of the one or more uniform resource locators within the presentation;

program instructions to present the metadata for each of the one or more uniform resource locators with a corresponding image from the presentation, wherein presenting includes utilizing a server-side component to retrieve metadata stored in a database for each of one or more identified uniform resource locators within a slide of the presentation and overlaying the metadata at a position within the corresponding image where each of the one or more identified uniform resource locators were originally located; and program instructions to create the clickable link for each of the one or more uniform resource locators with the corresponding image.

8. The computer program product of claim 7, wherein program instructions to identify one or more uniform resource locators within the presentation, further comprises:

program instructions to scan a plurality of slides within the presentation for one or more uniform resource locators; and wherein scanning includes utilizing a conventional text scanner to identify uniform resource locator text patterns and active hyperlinks.

9. The computer program product of claim 7, wherein program instructions to retrieve metadata for each of the one or more uniform resource locators within the presentation, further comprises:

program instructions to extract information related to each of one or more identified uniform resource locators.

10. The computer program product of claim 9, wherein information related to each of the one or more identified uniform resource locators includes at least one of:

a uniform resource locator text;

a page number from the presentation where an identified uniform resource locator exists; and a position of an identified uniform resource locator within a slide of the presentation.

11. The computer program product of claim 7, wherein program instructions to create the clickable link for each of the one or more uniform resource locators with the corresponding image, further comprises:

program instructions to identify a position within the image where an overlay of metadata for each of the one or more uniform resource locators is located; and program instructions to enable the overlay of the metadata for each of the one or more uniform resource locators to function as a clickable link at a position within the image that mirrors an original position of each of the one or more uniform resource locators identified in the presentation.

12. The computer program product of claim 11, further comprises:

program instructions to utilize a client-side component to present the metadata for each of the one or more uniform resource locators as a clickable link within an image screen shared during the live collaborative web meeting.

13. A computer system for a clickable link within a presentation during a live collaborative web meeting, the computer system comprising:
   one or more computer readable storage media;
   program instructions stored on at least one of the one or more computer readable storage media for execution by at least one of the one or more computer processors, the program instructions comprising:
   program instructions to identify one or more uniform resource locators within the presentation;
   program instructions to retrieve metadata for each of the one or more uniform resource locators within the presentation;
   program instructions to present the metadata for each of the one or more uniform resource locators with a corresponding image from the presentation, wherein presenting includes utilizing a server-side component to retrieve metadata stored in a database for each of one or more identified uniform resource locators within a slide of the presentation and overlaying the metadata at a position within the corresponding image where each of the one or more identified uniform resource locators were originally located; and
   program instructions to create the clickable link for each of the one or more uniform resource locators with the corresponding image.

14. The computer system of claim 13, wherein program instructions to identify one or more uniform resource locators within the presentation, further comprises:
   program instructions to scan a plurality of slides within the presentation for one or more uniform resource locators; and
   wherein scanning includes utilizing a conventional text scanner to identify uniform resource locator text patterns and active hyperlinks.

15. The computer system of claim 13, wherein program instructions to retrieve metadata for each of the one or more uniform resource locators within the presentation, further comprises:
   program instructions to extract information related to each of one or more identified uniform resource locators.

16. The computer system of claim 15, wherein information related to each of the one or more identified uniform resource locators includes at least one of:
   a uniform resource locator text;
   a page number from the presentation where an identified uniform resource locator exists; and
   a position of an identified uniform resource locator within a slide of the presentation.

17. The computer system of claim 13, wherein program instructions to create the clickable link for each of the one or more uniform resource locators with the corresponding image, further comprises:
   program instructions to identify a position within the image where an overlay of metadata for each of the one or more uniform resource locators is located;
   program instructions to enable the overlay of the metadata for each of the one or more uniform resource locators to function as a clickable link at a position within the image that mirrors an original position of each of the one or more uniform resource locators identified in the presentation; and
   program instructions to utilize a client-side component to present the metadata for each of the one or more uniform resource locators as a clickable link within an image screen shared during the live collaborative web meeting.

* * * * *